(12) United States Patent
Thompson et al.

(10) Patent No.: US 11,590,933 B2
(45) Date of Patent: Feb. 28, 2023

(54) METHODS AND SYSTEMS FOR CONTROLLING OPERATING CONDITIONS OF VEHICLE COMPONENTS

(71) Applicant: TOYOTA MOTOR ENGINEERING & MANUFACTURING NORTH AMERICA, INC., Plano, TX (US)

(72) Inventors: Derek A. Thompson, Ypsilanti, MI (US); Krishna V. Buddharaju, Northville, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 258 days.

(21) Appl. No.: 17/011,117

(22) Filed: Sep. 3, 2020

(65) Prior Publication Data

US 2022/0063562 A1   Mar. 3, 2022

(51) Int. Cl.
*B60R 25/30* (2013.01)
*B60R 25/01* (2013.01)
*B60R 25/10* (2013.01)

(52) U.S. Cl.
CPC ............ *B60R 25/305* (2013.01); *B60R 25/01* (2013.01); *B60R 25/10* (2013.01)

(58) Field of Classification Search
CPC ....... B60R 25/01; B60R 25/10; B60R 25/305; B60R 25/003; A01K 11/006; E05F 15/73; E05F 2015/765; E05F 2015/767
USPC .......................................... 348/148
See application file for complete search history.

(56) References Cited

U.S. PATENT DOCUMENTS

| 9,845,050 | B1 | 12/2017 | Garza et al. |
| 2007/0189749 | A1* | 8/2007 | Aoki ........................ G01S 17/08 396/106 |
| 2012/0050021 | A1 | 3/2012 | Manoharprasad et al. |
| 2012/0232749 | A1* | 9/2012 | Schoenberg ........... G08B 21/24 340/457 |
| 2018/0065453 | A1* | 3/2018 | Gaddis .................. G02F 1/0121 |
| 2019/0118603 | A1 | 4/2019 | Feit |
| 2019/0244101 | A1 | 8/2019 | Ando |

(Continued)

FOREIGN PATENT DOCUMENTS

JP   WO2014/054153 A1   4/2014

OTHER PUBLICATIONS

Korosec "Tesla 'Dog mode' and 'Sentry mode' are now live to guard your car and pets" https://techcrunch.com/2019/02/13/tesla-dog-mode-and-sentry-mode-are-now-live-to-guard-your-car-and-pets/, Feb. 14, 2019, 2 Pages. (Year: 2019).*

(Continued)

*Primary Examiner* — Nathnael Aynalem
(74) *Attorney, Agent, or Firm* — Dinsmore & Shohl LLP

(57) ABSTRACT

A method of controlling an operating condition of a seat belt warning mechanism and a power window of the vehicle is provided. The method, implemented by a computing device of the vehicle, includes detecting, using a sensor of the vehicle, an animal in an interior of the vehicle, activating, automatically and without user intervention, an operating mode for the vehicle responsive to detecting the animal, and controlling, based on the operating mode, an operating condition of a seat belt warning mechanism of the vehicle and an operating condition of a power window of the vehicle.

15 Claims, 3 Drawing Sheets

(56) References Cited

U.S. PATENT DOCUMENTS

2020/0130702 A1* 4/2020 Ferreira ............... B60W 10/30

OTHER PUBLICATIONS

Culture; 10. Tesla Model X; (https://www.caradvice.com.au/819866/the-best-cars-for-dogs-10-canine-friendly-vehicles-to-try/); Jan. 17, 2020; 8 pgs.

* cited by examiner

METHODS AND SYSTEMS FOR CONTROLLING OPERATING CONDITIONS OF VEHICLE COMPONENTS

TECHNICAL FIELD

The present specification relates to systems and methods for controlling operating conditions of a seat belt warning mechanism and a power window of a vehicle based on the detection of an animal in the interior of the vehicle.

BACKGROUND

Conventionally, vehicles include systems with one or more sensors installed therein may be used to detect one or more objects external to these vehicles. For example, proximity sensors, motion sensors (and other sensors) may be utilized detect approaching vehicles, pedestrians, and so forth. The data collected about these vehicles and/or pedestrians may then be accessible to drivers of vehicles to enable them to take appropriate actions, for example, evasive actions.

SUMMARY

In one embodiment, a method of controlling operating conditions of one or more vehicle components is provided. The method includes detecting, using a sensor of the vehicle, an animal in an interior of the vehicle, activating, automatically and without user intervention, an operating mode for the vehicle responsive to detecting the animal, and controlling, based on the operating mode, an operating condition of a seat belt warning mechanism of the vehicle and an operating condition of a power window of the vehicle.

In another embodiment, a system for controlling operating conditions of one or more vehicle components is provided. The system includes a sensor, one or more processors of a vehicle, and one or more non-transitory memory modules communicatively coupled to the one or more processors of the vehicle. The one or more non-transitory memory modules store machine-readable instructions that, when executed, cause the one or more processors to detect, detect, using the sensor of the vehicle, an animal in an interior of the vehicle that is within a proximity of the sensor; activate, automatically and without user intervention, an operating mode for the vehicle; and control, based on the operating mode, an operating condition of a seat belt warning mechanism of the vehicle and an operating condition of a power window of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
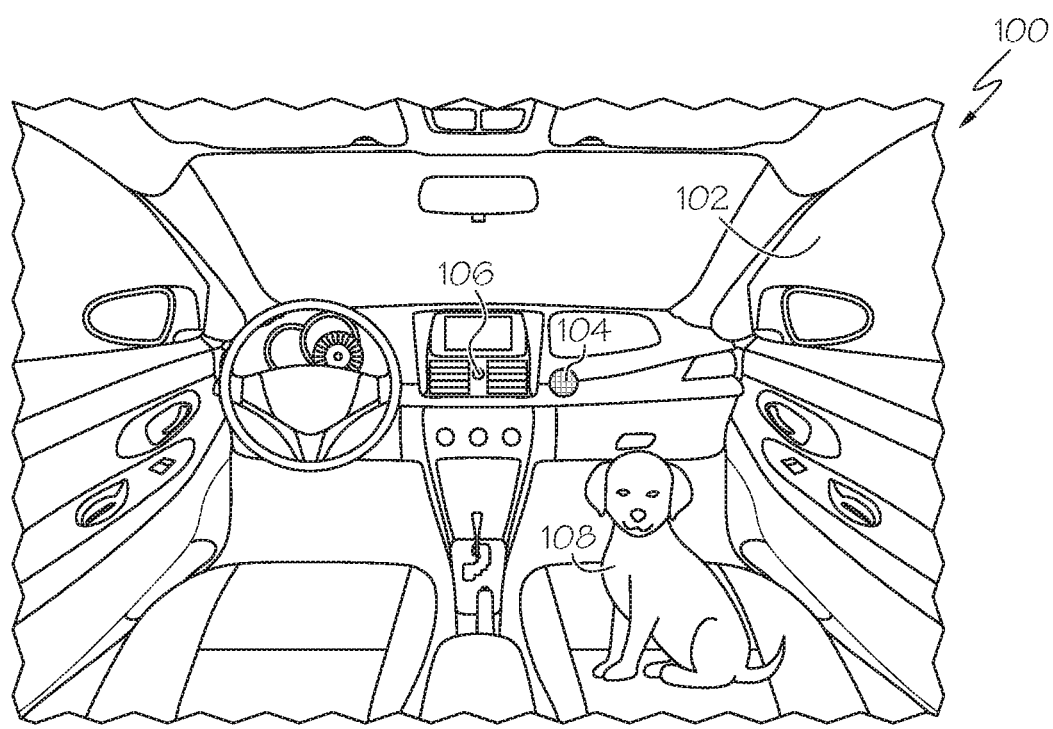
FIG. 1 schematically depicts an interior of the vehicle with one or more sensors that are configured to detect an object in the front seat and control the operation of one or more components of the vehicle based on the detected object, according to one or more embodiments shown herein.

FIG. 1 schematically depicts an example interior of an example vehicle 100 in which one or more sensors (e.g., a camera 106) may detect an object (e.g., a pet 108) in the front seat (e.g., a front passenger seat) and control the operation of one or more components of the vehicle 100 based on the detected object, according to one or more embodiments shown herein.

The vehicle may be an automobile that is driven by an individual, or any other passenger or non-passenger vehicle such as, for example, a terrestrial, aquatic, and/or airborne vehicle. In some embodiments, the vehicle 100 may be an autonomous vehicle that navigates its environment with limited human input or without human input. Other types of vehicles are also contemplated. Broadly speaking, the vehicle 100 includes a vehicle system (e.g., the vehicle system 220 depicted in FIG. 2, but not shown in FIG. 1) that is configured to capture a live video stream or one or more images of objects in the passenger seat and/or the driver's seat (e.g., the front seats of the vehicle 100). Additionally, one or more images or a live video stream of objects (e.g., additional pets) located in the rear seats (one or more back seats) of the vehicle may also be captured. Thereafter, in embodiments, the vehicle system 220 of the vehicle 100 may activate, in real time, an operating mode for the vehicle 100 in response to detecting the pet 108 in the passenger seat. Based on the operation mode, the operating conditions of a seat belt warning mechanism and/or power windows of the vehicle are modified. In particular, in embodiments, the seat belt warning mechanism and the power window 102 adjacent to the passenger seat of the vehicle 100 may be disabled. Additionally, the seat belt warning mechanism and the power windows adjacent to additional seats (e.g., the back seats of the vehicle 100) may also be disabled.

Figure 2:
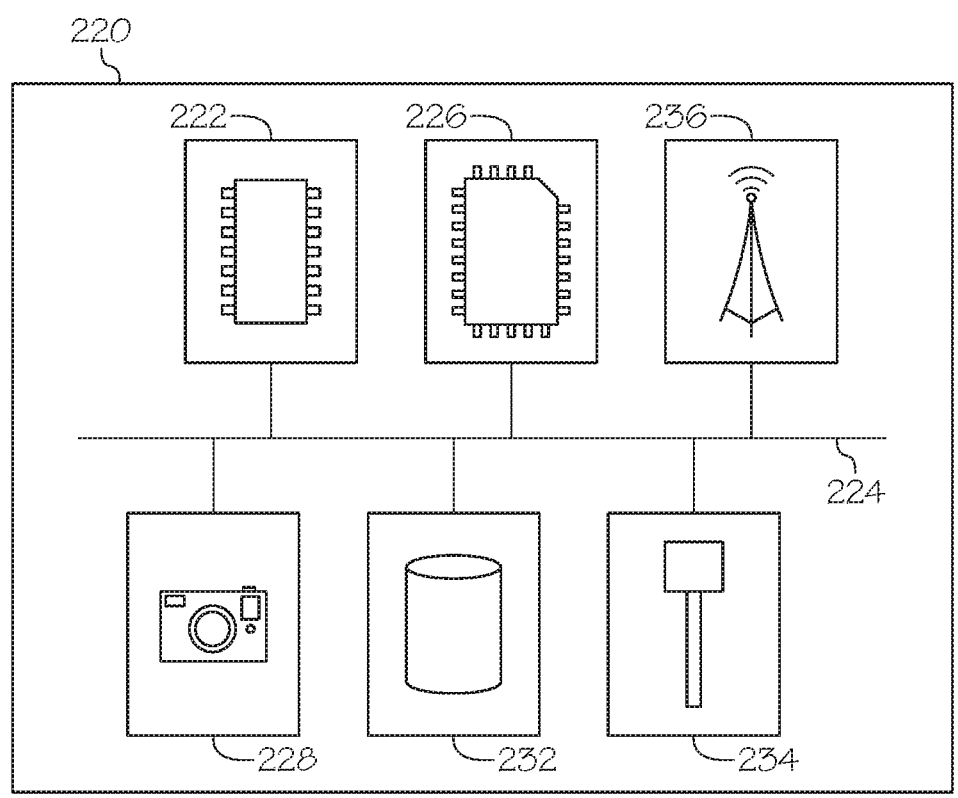
FIG. 2 schematically depicts non-limiting components of the vehicle system, according to one or more embodiments shown herein.

FIG. 2 schematically depicts non-limiting components of a vehicle system 220, according to one or more embodiments shown herein.

In embodiments, the vehicle system 220 includes one or more processors 222. Each of the one or more processors 222 may be any device capable of executing machine readable and executable instructions. Accordingly, each of the one or more processors 222 may be a controller, an integrated circuit, a microchip, a computer, or any other computing device. The one or more processors 222 are coupled to a communication path 224 that provides signal interconnectivity between various modules of the system. Accordingly, the communication path 224 may communicatively couple any number of processors 222 with one another, and allow the modules coupled to the communication path 224 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 224 may be formed from any medium that is capable of transmitting a signal such as, for example, conductive wires, conductive traces, optical waveguides, or the like. In embodiments, the communication path 224 may facilitate the transmission of wireless signals, such as WiFi, Bluetooth®, Near Field Communication (NFC) and the like. Moreover, the communication path 224 may be formed from a combination of mediums capable of transmitting signals. In one embodiment, the communication path 224 comprises a combination of conductive traces, conductive wires, connectors, and buses that cooperate to permit the transmission of electrical data signals to components such as processors, memories, sensors, input devices, output devices, and communication devices. Accordingly, the communication path 224 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Referring to FIG. 2, the vehicle system 220 also includes one or more memory modules 226 coupled to the communication path 224. The one or more memory modules 226 may comprise RAM, ROM, flash memories, hard drives, or any device capable of storing machine readable and executable instructions such that the machine readable and executable instructions can be accessed by the one or more processors 222. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 226. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the vehicle system 220 includes one or more sensors 228 that may be configured as any device having an array of sensing devices capable of detecting radiation in an ultraviolet wavelength band, a visible light wavelength band, or an infrared wavelength band. The one or more sensors 228 may have any resolution. In embodiments, one or more optical components, such as a mirror, fish-eye lens, or any other type of lens may be optically coupled to the one or more sensors 228. In embodiments described herein, the one or more sensors 228 may provide image data to the one or more processors 222 or another component communicatively coupled to the communication path 224. The image data may include real time image data, live video stream data, and the like. The one or more sensors 228 may also include high definition cameras, standard definition cameras, and so forth.

In other embodiments, the one or more sensors 228 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the vehicle system 220.

In operation, the one or more sensors 228 capture image data (for example, one or more images of an animal located or seated in a passenger seat (e.g., front seat) of the vehicle 100) and communicate these images to the one or more processors 222 and/or to other systems communicatively coupled to the communication path 224. The image data may be received by the one or more processors 222, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms. For example, in embodiments, the one or more images captured of the animal in the passenger seat of the vehicle 100 may be digitally processed (e.g., by the one or more processors 222) such that the object in the image (e.g. a dog) may be recognized and/or classified, for example, using various object recognition software applications. Other variations on this operation are also contemplated.

Still referring to FIG. 2, the vehicle system 220 may a satellite antenna 234 coupled to the communication path 224 such that the communication path 224 communicatively couples the satellite antenna 234 to other modules of the vehicle system 220. The satellite antenna 234 is configured to receive signals from global positioning system satellites. Specifically, in one embodiment, the satellite antenna 234 includes one or more conductive elements that interact with electromagnetic signals transmitted by global positioning system satellites. The received signal is transformed into a data signal indicative of the location (e.g., latitude and longitude) of the satellite antenna 234 or an object positioned near the satellite antenna 234, by the one or more processors 222.

Still referring to FIG. 2, the vehicle system 220 also includes network interface hardware 236. The network interface hardware 236 can be communicatively coupled to the communication path 224 and can be any device capable of transmitting and/or receiving data. Accordingly, the network interface hardware 236 can include a communication transceiver for sending and/or receiving any wired or wireless communication. For example, the network interface hardware 236 may be configured as part of a data communication module (DCM) and include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 236 includes hardware configured to operate in accordance with the Bluetooth® wireless communication protocol.

Figure 3:
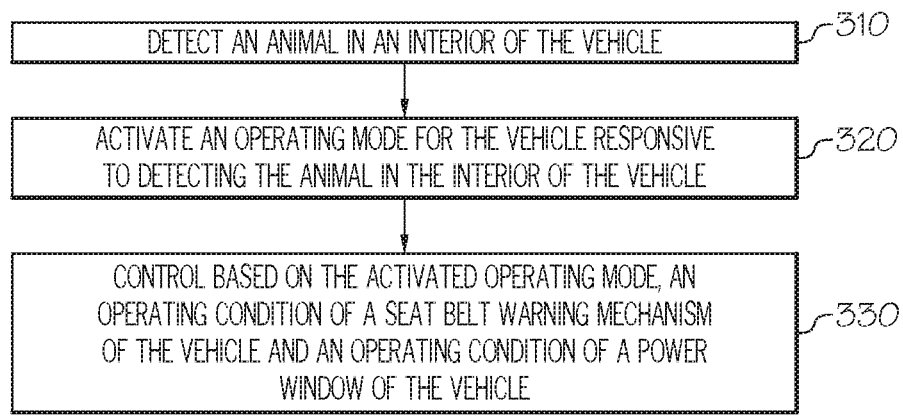
FIG. 3 schematically depicts a flowchart of the vehicle system described herein that is configured to automatically control operating conditions of various components of the vehicle, according to one or more embodiments shown herein.

FIG. 3 schematically illustrates automatically control operating conditions of various components of the vehicle, according to one or more embodiments shown herein.

In step 310, the one or more sensors 228 are utilized by the one or more processors 222 of the vehicle system 220 installed in the vehicle 100 to detect an animal in the interior of the vehicle 100, for example, on a front seat or passenger seat of the vehicle 100. For example, as depicted in FIG. 1, the one or more sensors 228 (e.g., the camera 106) may be utilized to capture one or more images of a pet 108 sitting on the front seat. In embodiments, the camera 106 may automatically be activated when the vehicle 100 is turned on and being capturing images of the driver's seat and the passenger's seat at predefined intervals. Alternatively, the camera 106 may be configured to capture a live video stream of the driver's seat, passenger's seat, and the entirety of the interior of the vehicle 100. The captured images or live video stream may be analyzed by the one or more processors 202 using one or more image processing algorithms as described above. In embodiments, one or more object recognition applications may be utilized to identify and distinguish between, e.g., animals and humans. In this way, one or more images of an object in the passenger seat may be classified as the pet 108.

In step 320, the one or more processors 222 of the vehicle system 220 installed in the vehicle 100 may activate, in real time and without user intervention, an operating mode for the vehicle 100 in response to detecting an animal in the interior of the vehicle 100. For example, in embodiments, the one or more processors 222 may activate specific operating conditions within the vehicle 100 when the one or more sensors 228 capture images of, for example, the pet 108 in the passenger seat of the vehicle. In embodiments, these operating conditions are modifications of standard operating conditions of various parts of the vehicle, e.g., power windows, power doors, seat belt warning sounds, and/or the like. For example, the one or more processors 222 may modify operating conditions of power windows (e.g., the power window 102) such that only a select number of the power windows of the vehicle 100 may fully function. In addition, the one or more processors 222 may modify the functionality of the seat belt warning mechanism (e.g., seat belt warning sounds) based on the one or more sensors 228 (e.g., the camera 106) detecting the pet 108 in a front seat (e.g., the passenger seat) of the vehicle 100. In embodiments, additional functionalities such as the operation of the seat warmers, recliners, and one or more features designated for the passenger seat may be modified. In embodiments, the seat warmers may be turned off, the recliners may only operate to a certain percentage of their standard operation (e.g., the seat may only recline up to 50% of the full range) or may be temporarily non-operational, and so forth.

In step 340, the one or more processors 222 may control in real time, based on the operating mode, an operating condition of the seat belt warning mechanism (e.g., seat belt alarm sound) and an operating condition of the power window 102 of the vehicle 100. For example, if the pet 108 contacts the switch on the passenger door that controls the operation of the power window 102, the one or more processors 222 may prevent the window from moving upwards or downwards, because in the operating mode described above, the standard operation of the power window 102 adjacent the passenger seat (e.g., a front seat) of the vehicle 100 has been disabled. Additionally, in embodiments, an operating condition of the seat belt warning mechanism (e.g., one or more seat belt alarms) may be disabled. As such, in embodiments, under the operating mode described above, the seat belt alarm designated for the passenger seat will not sound for the entirety of the time that the pet 108 is located on the passenger seat. Alternatively, the seat belt warning sound may only sound a few times, which may still warn the driver, but the nuisance caused by the seat belt warning continuing to sound, e.g., until the seat belt has been locked in place, will be eliminated. While embodiments in which the operating conditions of the seat belt warning mechanism and power window 102 are both entirely disabled are discussed, other embodiments of controlling operating conditions of various components of the vehicle 100 are also contemplated.

Figure 4:
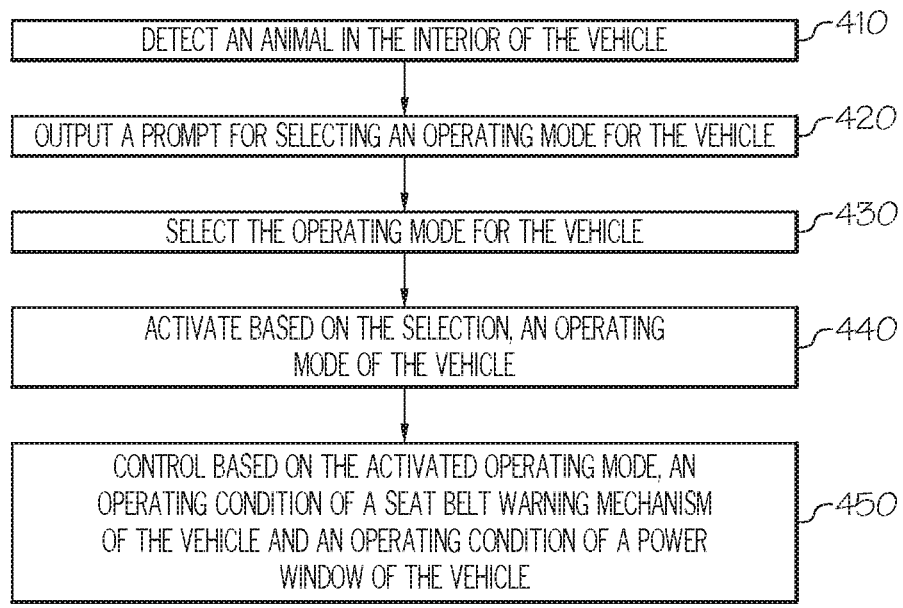
FIG. 4 schematically depicts a flowchart of the vehicle system described herein that is configured to control operating conditions of various components of the vehicle, according to one or more embodiments shown herein.

FIG. 4 schematically depicts a flowchart of another example method of controlling the operating conditions the vehicle 100, according to one or more embodiments shown herein.

In step 410, as stated above, the one or more sensors 228 may detect an animal in the interior of the vehicle 100, for example, on the passenger seat (e.g., a front seat) of the vehicle 100. In embodiments, the one or more sensors 228 (e.g., the camera 106) may capture a plurality of images of objects in the driver's seat and passenger seat of the vehicle 100 and/or capture a live video stream these areas.

In step 420, the one or more processors 222 of the vehicle system 220 may output, on a display installed within the vehicle 100, a prompt for selecting an operating mode for the vehicle. In embodiments, the display may be a screen that may be configured to output a map, navigation information, entertainment, and the like. In embodiments, the screen may be configured to output digital content such as high definition digital images, a live video stream, and so forth. In embodiments, the prompt may be a textual message that appears on the display, e.g., "Turn on Dog Passenger Mode", or "Turn on Pet Passenger Mode", and or the like. Alternatively or additionally, the prompt may be output via one or more speakers of the vehicle 100. For example, the one or more processors 222 may output a voice command that asks the driver whether he or she would like to, e.g., "Turn on Dog Passenger Mode", or "Turn on Pet Passenger Mode", and/or the like.

In step 430, the one or more processors 222 may recognize a selection of the operating mode for the vehicle. For example, a driver may select an operating mode, by touching a portion of the display or selecting a switch or button located adjacent to the display that is communicatively coupled to the display (e.g., via wired or wireless connection). Alternatively or additionally, the one or more processors 222 may instruct the speakers of the vehicle 100 to output a voice prompt, in response to which the driver may speak a phrase to select the operating mode for the vehicle, e.g., "Turn on Dog Passenger", or "Turn on Pet Passenger Mode", and/or the like. Other ways of selecting the passenger mode are also contemplated.

In step 440, the one or more processors 222 may activate in real time, based on the selection, the operating mode of the vehicle 100. As extensively discussed above, the selection of the mode may result in the modification of the operating conditions of various parts of the vehicle, e.g., power windows, power doors, seat belt warning sounds, and/or the like. For example, the one or more processors 222 may modify operating conditions of power windows (e.g., the power window 102) such that only a select number of the power windows of the vehicle 100 may fully function. In embodiments, the operation of one or more power windows of the vehicle 100 may be fully disabled.

In addition, the one or more processors 222 may modify the functionality of the seat belt warning mechanism (e.g., seat belt warning sounds) based on the selection of the operating mode. In embodiments, additional functionalities such as the operation of the seat warmers, recliners, and one or more features designated for the passenger seat may be modified or temporarily disabled. In embodiments, the seat warmers may be turned off, the recliners may only operate to a certain percentage of their standard operation (e.g., the seat may only recline up to 50% of the full range) or may be temporarily non-operational, and so forth.

In step 450, the one or more processors 222 may control in real time, based on the operating mode, an operation condition of the seat belt warning mechanism of the vehicle 100 and an operating condition of a power window 102 of the vehicle 100. It is noted that step 450 in FIG. 4 is comparable to step 330 in FIG. 3.

For example, as discussed above, if the pet 108 contacts the switch on the passenger door that controls the operation of the power window 102, the one or more processors 222 may prevent the window from moving upwards or downwards. Additionally, the seat belt alarm designated for the passenger seat (e.g., an alarm that continually sounds until the seat belt is properly fixed) may not sound for the entirety of the time that the pet 108 is located on the passenger seat. Alternatively, the seat belt warning sound may only sound a few times, which may still warn the driver, but the nuisance caused by the seat belt warning continuing to sound will be eliminated. While embodiments in which the operating conditions of the seat belt warning mechanism and power window 102 are both entirely disabled are discussed, other embodiments of controlling operating conditions of various components of the vehicle 100 are also contemplated.

It should now be understood that the embodiments described herein are directed to methods for controlling operating conditions of various vehicle systems when a pet is detected within the interior of the vehicle.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method implemented by a computing device of a vehicle, the method comprising:
    detecting, using a sensor of the vehicle, an animal in an interior of the vehicle;
    activating, automatically and without user intervention, an operating mode for the vehicle responsive to detecting the animal; and
    controlling, based on the operating mode, an operating condition of a seat belt warning mechanism of the vehicle and an operating condition of a power window of the vehicle, wherein controlling the operating condition of the seat belt warning mechanism includes disabling the seat belt warning mechanism.

2. The method of claim 1, wherein the sensor is configured to detect the animal in the front seat of the interior of the vehicle.

3. The method of claim 1, wherein controlling the operating condition of the power window includes disabling operation of the power window adjacent to a front seat of the vehicle.

4. The method of claim 1, wherein the sensor is a camera.

5. The method of claim 1, further comprising:
    detecting, using the sensor of the vehicle, an additional animal on a back seat of the vehicle; and
    controlling, based on the detecting, an operating condition of an additional power window adjacent to the back seat of the vehicle.

6. A system comprising:
    a sensor;
    one or more processors of a vehicle; and
    one or more non-transitory memory modules communicatively coupled to the one or more processors of the vehicle and storing machine-readable instructions that, when executed, cause the one or more processors to:
        detect, using the sensor of the vehicle, an animal in an interior of the vehicle that is within a proximity of the sensor;
        activate, automatically and without user intervention, an operating mode for the vehicle; and
        control, based on the operating mode, an operating condition of a seat belt warning mechanism of the vehicle and an operating condition of a power window of the vehicle by disabling operation of the power window adjacent to a front seat of the vehicle.

7. The system of claim 6, wherein the sensor is configured to detect the animal in the front seat of the interior of the vehicle.

8. The system of claim 6, wherein the machine-readable instructions, when executed, cause the one or more processors to control the operating condition of the seat belt warning mechanism by disabling the seat belt warning mechanism.

9. The system of claim 6, wherein the sensor is a camera.

10. The system of claim 6, wherein the machine-readable instructions, when executed, further cause the one or more processors to:
   detect, using the sensor of the vehicle, an additional animal on a back seat of the vehicle; and
   control, based on the detecting, an operating condition of an additional power window adjacent to the back seat of the vehicle.

11. A method implemented by a computing device of a vehicle, the method comprising:
   detecting, using a sensor of the vehicle, an animal in an interior of the vehicle;
   outputting, on a display of the computing device, a prompt for selecting an operating mode for the vehicle;
   selecting, via the computing device, the operating mode for the vehicle;
   activating, based the selection, the operating mode for the vehicle; and
   controlling, based on the operating mode, an operating condition of a seat belt warning mechanism of the vehicle and an operating condition of a power window of the vehicle, wherein controlling the operating condition of the seat belt warning mechanism includes disabling the seat belt warning mechanism.

12. The method of claim 11, wherein sensor is configured to detect the animal in the front seat of the interior of the vehicle.

13. The method of claim 11, wherein controlling the operating condition of the power window includes disabling operation of the power window adjacent to a front seat of the vehicle.

14. The method of claim 11, wherein the sensor is a camera.

15. The method of claim 11, further comprising:
   detecting, using the sensor of the vehicle, an additional animal on a back seat of the vehicle; and
   controlling, based on the detecting, an operating condition of an additional power window adjacent to the back seat of the vehicle.

* * * * *